(12) United States Patent
Tabor et al.

(10) Patent No.: US 6,316,108 B1
(45) Date of Patent: Nov. 13, 2001

(54) PROCESS FOR COATING SUBSTRATES HAVING POLAR SURFACES WITH POLYURETHANE LATEXES

(75) Inventors: Rick L. Tabor, Missouri City; Wayne R. Willkomm, Lake Jackson, both of TX (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/283,137

(22) Filed: Mar. 31, 1999

Related U.S. Application Data

(60) Provisional application No. 60/080,282, filed on Apr. 1, 1998.

(51) Int. Cl.$^7$ .................................................. B32B 27/40
(52) U.S. Cl. ................................................... 428/423.1
(58) Field of Search .................... 528/59, 60, 61; 529/591, 839; 428/423.1, 423.4, 425.8, 424.6

(56) References Cited

U.S. PATENT DOCUMENTS

| | | | |
|---|---|---|---|
| 2,929,800 | 3/1960 | Hill, Jr. .................. | 260/77.5 |
| 2,968,575 | 1/1961 | Mallonee .................. | 106/287 |
| 3,148,173 | 9/1964 | Axelrood et al. .......... | 260/75 |
| 3,178,310 | 4/1965 | Berger et al. ............ | 117/142 |
| 3,210,302 | 10/1965 | Bowell et al. ............ | 260/18 |
| 3,294,724 | 12/1966 | Axelrood et al. .......... | 260/29.2 |
| 3,360,599 | 12/1967 | Nyberg et al. ............ | 264/216 |
| 3,401,133 | 9/1968 | Grace et al. ............. | 260/29.2 |
| 3,410,817 | 11/1968 | McClellan, Jr. et al. ... | 260/29.2 |
| 3,437,624 | 4/1969 | Dawn et al. .............. | 260/29.2 |
| 3,503,917 | 3/1970 | Burke, Jr. et al. ........ | 260/29.6 |
| 3,563,943 | 2/1971 | Davis et al. ............. | 260/29.2 |
| 3,997,592 | 12/1976 | Aufdermarsh, Jr. et al. . | 260/471 |
| 4,046,729 | 9/1977 | Scriven et al. ........... | 260/29.2 |
| 4,066,591 | 1/1978 | Scriven et al. ........... | 260/29.2 |
| 4,123,403 | 10/1978 | Warner et al. ............ | 260/29.2 |
| 4,147,679 | 4/1979 | Scriven et al. ........... | 260/29.2 |
| 4,436,784 | 3/1984 | Ehrhart .................. | 428/423.1 |
| 4,507,413 | 3/1985 | Thoma et al. ............. | 524/42 |
| 4,540,633 | 9/1985 | Kucera et al. ............ | 428/423.1 |
| 4,558,090 | 12/1985 | Drexler et al. ........... | 524/591 |
| 4,733,659 | 3/1988 | Edenbaum et al. .......... | 128/156 |
| 4,921,842 | 5/1990 | Henning et al. ........... | 524/840 |
| 5,037,864 | 8/1991 | Anand et al. ............. | 523/348 |
| 5,043,381 | 8/1991 | Coogan et al. ............ | 524/591 |
| 5,185,200 | 2/1993 | Tirpak et al. ............ | 428/288 |
| 5,227,422 | 7/1993 | Mitsuji et al. ........... | 524/457 |
| 5,281,655 | 1/1994 | Mitsuji et al. ........... | 524/507 |
| 5,464,677 | * 11/1995 | Corbin et al. ............ | 428/95 |
| 5,539,021 | 7/1996 | Pato et al. .............. | 523/335 |
| 5,959,027 | * 9/1999 | Jakubowski et al. ........ | 524/339 |

FOREIGN PATENT DOCUMENTS

| | | |
|---|---|---|
| 1 432 112 | 4/1976 | (DE) . |
| 0 742 239 | 11/1996 | (EP) . |
| 95/08583 | 3/1995 | (WO) . |

* cited by examiner

*Primary Examiner*—Blaine Copenheaver
*Assistant Examiner*—Christopher Paulraj

(57) ABSTRACT

Claimed is a substrate having a polar surface and, adherent thereto, a polyurethane polymer which was applied as a latex. The latexes of the present invention are chain extended in water with aminoethyl ethanolamine and are prepared and applied in the substantial absence of organic solvents. The prepolymers used to prepare the latexes are substantially free ionic groups on the polymer backbone.

11 Claims, No Drawings

PROCESS FOR COATING SUBSTRATES HAVING POLAR SURFACES WITH POLYURETHANE LATEXES

This application claims the benefit of U.S. Provisional application No. 60/080,282, filed Apr. 1, 1998. A related copending application is U.S. Ser. No. 09/646,945 filed Sep. 21, 2000 as a national phase filing from Patent Cooperation Treaty Application PCT/US99/07147 filed Mar. 31, 1999 which published as WO 99/50329 on Oct. 7, 1999, also claiming priority on U.S. Provisional Application No. 60/080,282 filed Apr. 1, 1998.

BACKGROUND OF THE INVENTION

This invention relates to polyurethane latexes, processes for preparing them, polymers prepared therewith, and substrates coated therewith. This invention particularly relates to coating substrates having polar surfaces with polyurethane latexes.

Latex polymers are known to be useful in many applications such as paints, sealants, and films. Polyurethane latexes are less widely used due to inherent difficulties in preparing stable aqueous polyurethane latexes. For example, polyurethane formulation components, such as polyisocyanates can be reactive with water. Polyurethane prepolymers useful for forming latexes are often not low viscosity liquids at ambient conditions. These and other properties can cause polyurethane latexes to be unstable, that is to form a dispersion which separates from the continuous aqueous phase of the latex, which is often not desirable in an industrial venue.

Recently, there have been several advances in the art of preparing stable, organic solvent free, polyurethane latexes. For example, U.S. application Ser. No. 09/039,976 filed Mar. 16, 1998, the teachings of which published as WO 98/41554 on Sep. 24, 1998, discloses preparing such polyurethane latexes. U.S. application Ser No. 09/039,978 filed Mar. 16, 1998, now abandoned in favor of its divisional application, U.S. application Ser. No. 09/551,400 filed Apr. 19, 2000, discloses preparing carpets using polyurethane latexes. As these latexes become more available and widely used, it will be desirable to improve their performance, particularly in regard to physical properties.

It would be desirable in the art of coating substrates with polyurethane latexes to be able to coat substrates having polar surfaces with a polyurethane latex having good adhesion thereon. It would be particularly desirable if the polyurethane latex which has good adhesion on polar surfaces was an aqueous, organic solvent free, polyurethane latex.

SUMMARY OF THE INVENTION

In one aspect, the present invention is an article of manufacture comprising a substrate having a polar surface, and adherent thereto, a polyurethane polymer prepared from a latex herein: (A) the polyurethane latex is. prepared from a polyurethane repolymer which has a polymer backbone substantially free of ionic groups and is prepared from a prepolymer formulation which includes polyols having an average ethylene oxide content of less than 80 weight percent, (B) the prepolymer is chain extended with an aminoethyl ethanolamine (AEEA) chain extender, and (C) the prepolymer and latex are prepared in the substantial absence of an organic solvent.

In another aspect, the present invention is a process for preparing a latex coated substrate comprising applying a polyurethane latex to a polar surface of a substrate having a polar surface wherein: (A) the polyurethane latex is prepared from a polyurethane prepolymer which has a polymer backbone substantially free of ionic groups and is prepared from a prepolymer formulation which includes polyols having an average ethylene oxide content of less than 80 weight percent, (B) the prepolymer is chain extended with an AEEA chain extender, and (C) the prepolymer and latex are prepared in the substantial absence of an organic solvent.

In still an another aspect, the present invention is a polyurethane latex which can be used to prepare a polyurethane polymer having improved adhesion properties comprising a polyurethane latex wherein: (A) the polyurethane latex is prepared from a polyurethane prepolymer which has a polymer backbone substantially free of ionic groups and is prepared from a prepolymer formulation which includes polyols having an average ethylene oxide content of less than 80 weight percent, (B) the prepolymer is chain extended with an AEEA chain extender, and (C) the prepolymer and latex are prepared in the substantial absence of an organic solvent.

DESCRIPTION OF THE PREFERRED EMBODIMENTS

In preparing embodiments of the present invention, a polyurethane latex is formed. For the purposes of the present invention, the term "polyurethane" is defined to include the compounds known in the art as "polyureas". The terms polyurea and polyurethane are well known in the art of preparing polymers, but for clarity, these terms are defined as follows. A "polyurethane" is a polymer having a structure similar to that of a polymer prepared by reacting a polyisocyanate and a poly-alcohol. A "polyurea" is a polymer having a structure similar to that of a polymer prepared by reacting a polyisocyanate with a polyamine. It is further recognized in the art of preparing polyurethanes that either material can have some linkages other than the named primary linkage. For example, a polyurethane prepared using a base polyol but also an amine chain extender would have some urea linkages but would still be a polyurethane. Likewise a polyurea prepared using a base polyamine but also using a glycol chain extender would have some urethane linkages but would still be a polyurea, but may be referred to herein also as a polyurethane.

The polymers of the present invention are prepared by applying a latex to a substrate. The latex can be applied by means of painting or spraying. For purposes of the present invention, painting is defined as applying a material, such as a polyurethane latex, to a brush or other applicator, and then depositing the polyurethane latex on a substrate, or, in alternative, the material can be puddled or pooled on a substrate and then spread over the substrate using a brush or other spreading means. Also for the purposes of the present invention, spraying is defined as applying a material, such as a polyurethane latex, by atomizing the material and ejecting the atomized material onto the substrate.

Another process useful with the present invention for applying a polyurethane latex to a substrate is dipping. In a dipping process, a substrate is lowered into a pool of latex and then removed. The latex which is retained on the substrate can be allowed to dry as is or can be further spread to make a more even application. Parts of the substrate can be masked to avoid getting polyurethane latex on the entire surface of the dipped substrate.

Still another process for applying a latex to substrate useful with the present invention is application by means of a transfer process. In a transfer process, a polyurethane latex is applied to a material which has very little ability to adhere to the polymer which forms upon dehydration. This "transfer" material is brought into contact with another substrate which has a higher adhesive affinity for the polymer. The transfer material is removed and the polymer is retained on the substrate. While the above processes for applying a latex to a substrate are preferred, any process known to be useful to one of ordinary skill in the art for applying a polyurethane latex to a substrate can be used with the present invention.

The polyurethane latexes of the present invention have improved adhesion to polar surfaces. For the purposes of the present invention, a polar surface is one having a critical surface tension of wetting (CST) greater than 33 dynes/cm. Preferably the CST is from 33 to 2,000 dynes/cm. More preferably from 35 to 1,800 dynes/cm. Examples of materials having polar surfaces include, but are not limited to: steel, polyethylene terephthalate, polyvinyl chloride, polyurethane, nylon-6, polyvinylidene chloride, and polycarbonate. Examples of materials having nonpolar substrates include polyethylene, polypropylene and polytetrafluoroethylene.

After being applied, a polyurethane latex of the present invention is dried to produce a polymer. Any means of drying the polyurethane latex can be used which is known to be useful to those of ordinary skill in the art. For example, the polyurethane latex coating can be air dried at ambient conditions or it can be dried at elevated temperatures, optionally in reduced humidity or with forced air. The two considerations of choosing drying conditions for the present invention are 1) not to exceed the temperature tolerance of the polyurethane polymer or the support and 2) not to remove water from the latex so quickly that the film is interrupted due to bubbling unless a bubbled finished is desired. Any drying conditions, optionally with additional drying aids, such as forced air, which is known to be useful to those of ordinary skill in the art of coating substrates with polyurethane latexes can be used with the present invention.

In the process of the present invention, a polyurethane prepolymer formulation and a surfactant are emulsified with water. The surfactant can be present in an amount of from about 0.1 percent to about 3.5 percent of the solids content of the latex. Preferably, the surfactant is present at an amount of from about 1 to 3.5 percent of the solids content of the latex. The surfactant can be ionic or nonionic. If non-ionic, preferably the surfactant is a an ethoxylated alcohol, ethoxylated fatty acid, sorbitan derivative, lanolin derivative, ethoxylated nonyl phenol or a alkoxylated polysiloxane.

Preferably, the surfactant is an ionic surfactant which does not react significantly with isocyanate groups and most preferably the surfactant is an anionic surfactant.

Suitable classes of surfactants include, but are not restricted to sulfates of ethoxylated phenols such as poly (oxy-1,2-ethanediyl)alpha-(nonylphenyl)omega-hydroxysulfate ammonium salt; alkali metal fatty acid salts such as alkali metal oleates and stearates; alkali metal lauryl sulfates, quaternary ammonium surfactants; alkali metal alkylbenzene sulfonates such as branched and linear sodium dodecylbenzene sulfonates; anionic fluorocarbon surfactants such as alkali metal perfluoroalkyl sulfonates; dodecyl benzene sulfonic acid trialkyl amine salts; dodecyl benzene sulfonic acid ammonium salts; trialkanol amine lauryl sulfates; ammonium lauryl sulfates; trialkyl amine lauryl sulfates; ammonium lauryl sulfonates; alkali metal lauryl sulfonates; trialkanol amine lauryl sulfonates; trialkyl amine lauryl sulfonates; lauryl dimethyl amine oxide; dodecyl diphenyl oxide di(sulfonic acid) alkali metal salt; dodecyl diphenyl oxide di(sulfonic acid) trialkanol amine salts; dodecyl diphenyl oxide di(sulfonic acid) trialkyl amine salts; dodecyl diphenyl oxide di(sulfonic acid) ammonium salts; alkyl phenol polyethoxylate; polyoxyethylene/ polyoxypropylene block copolymers; polyoxyethylene/ polyoxybutylene block copolymers; and alkali metal soaps of modified resins. Particularly preferred surfactants are dodecyl benzene sulfonic acid trialkanol amine salt, dodecyl benzene sulfonic acid triethanol amine salt, dodecyl benzene sulfonic acid sodium salt; and triethanol amine laurylsulfate.

The polyurethane latexes of the present invention are prepared using any polyurethane formulation which can be used to prepare a polymer which is stable as an aqueous latex without the use of an organic solvent. Included in this group are polyurethane formulations which include a polyisocyanate component and an isocyanate reactive component also known as an active hydrogen containing material or polyol. The term "polyurethane" is not limited to those polymers which include only polyurethane linkages. It is well understood by those of ordinary skill in the art of preparing polyurethanes that polyurethanes also includes polymers containing allophanate, biuret, carbodiimide, oxazolinyl, isocyanurate, uretidinedione, urea, and other linkages in addition to urethane. Similarly, polyureas too can have such linkages.

A polyurethane prepolymer useful with the present invention can be an isocyanate terminated prepolymer. The polymer of a latex formed by admixing a prepolymer with a chain extender and water can be an isocyanate terminated polymer, an active hydrogen terminated polymer, or the reaction product of an admixture of a polyisocyanate and a polyisocyanate reactive component and chain extender at near stoichiometric concentrations. The prepolymer can be formed by reacting the components of a prepolymer formulation including a polyisocyanate component and an active hydrogen component. The latex is formed by reacting a prepolymer and a chain extender in a continuous aqueous phase. The prepolymer may, optionally, be formulated to react wherein the water of the continuous aqueous phase is a minor chain extender.

The polyisocyanate component of the prepolymer formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. Preferred polyisocyanates are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluene-diisocyanate, as well as the corresponding isomeric mixtures; 4,4'-, 2,2'- and 2,4'-dicyclohexylmethanediisocyanate, as well as the corresponding isomeric mixtures. 1,3 Tetramethylene xylene diisocyanate can also be used with the present invention.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents of from about 10 to about 40 weight percent, more preferably from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Suitable prepolymers for use as the polyisocyanate component of the prepolymer formulations of the present invention are prepolymers having NCO contents of from about 2 to about 40 weight percent, more preferably from about 4 to about 30 weight percent. These prepolymers are prepared by reaction of the di- and/or poly-isocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having in NCO contents of from about 5 to about 40 weight percent, more preferably about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene 20 glycols, dipropylene glycols, polyoxyethylene glycols, ethylene glycols, propylene glycols, butylene glycols, polyoxypropylene glycols and polyoxypropylenepolyoxyethylene glycols can be used. Polyester polyols can also be used as well as alkyl diols such as butane diol.

Other diols also useful include bishydroxyethyl- or bishydroxypropyl-bisphenol A, cyclohexane dimethanol, and even bishydroxyethyl hydroquinone.

Particularly useful as the polyisocyanate component of the prepolymer formulations of the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from about 2 to about 35 weight percent, based on the weight of the prepolymer, prepared by the reaction of polyols, having a functionality of preferably from 1.75 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 1.5. More preferred is an average functionality of from about 1.75 to about 3.5. The viscosity of the polyisocyanate component is preferably from about 25 to about 5,000 centipoise (cPs) (0.025 to about 5 Pa·s), but values from about 100 to about 1,000 cPs at 25° C. (0.1 to 1 Pass) are preferred for ease of processing. Similar viscosities are preferred where alternative polyisocyanate components are selected. Still, preferably, the polyisocyanate component of the formulations of the present invention is selected from the group consisting of MDI, PMDI, an MDI prepolymer, a PMDI prepolymer, a modified MDI and mixtures thereof.

The prepolymer formulations of the present invention include a polyol component. Polyfunctional active hydrogen containing materials useful with the present invention can include materials other than those already described hereinabove. Active hydrogen terminated prepolymers useful with the present invention include active hydrogen adjuncts of the polyisocyanates and polyisocyanate terminated prepolymers described hereinabove. Active hydrogen containing compounds most commonly used in polyurethane production are those compounds having at least two hydroxyl groups or amine groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2, 6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the propylene oxide adducts and ethylene oxide capped propylene oxide adducts of dihydroxy- and trihydroxyalkanes. Other useful alkylene oxide adducts include adducts of ethylene diamine, glycerin, piperazine, water, ammonia, 1,2,3,4-tetrahydroxy butane, fructose, sucrose, and the like.

Also preferred are poly(oxypropylene) glycols, triols, tetrols and hexols and any of these that are capped with ethylene oxide. These polyols also include poly (oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Another class of polyols which can be used with the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol. 44014A Polyester polyols can be used to prepare the polyurethane latexes of the present invention. Polyester polyols are generally characterized by repeating ester units which can be aromatic or aliphatic and by the presence of terminal primary or secondary hydroxyl groups, but any polyester terminating in at least 2 active hydrogen groups can be used with the present invention. For example, the reaction product of the tranesterification.of glycols with poly(ethylene terephthalate) can be used to prepare the latexes of the present invention.

Polyamines, amine-terminated polyethers, polymercaptans and other isocyanate-reactive compounds are also suitable in the present invention. Polyisocyanate polyaddition active hydrogen containing compounds (PIPA) can be used with the present invention. PIPA compounds are typically the reaction products of TDI and triethanolamine. A process for preparing PIPA compounds can be found in, for example, U.S. Pat. No. 4,374,209, issued to Rowlands.

Additionally, it is necessary that the latex formulation include a chain extender. A major amount of the latex chain extender in the latex formulations of the present invention is AEEA. Minor amounts of other latex chain extenders can also be used.

Any chain extender known to be useful to those of ordinary skill in the art of preparing polyurethanes can be used with the present invention as the minor latex chain extender. Such latex chain extenders typically have a molecular weight of about 30 to about 500 and have at least two active hydrogen containing groups. Polyamines are the most preferred chain extenders. Other materials, particularly water, can function to extend latex chain length and so are latex chain extenders for purposes of the present invention. It is particularly preferred that the latex chain extender be selected from the group consisting of amine terminated polyethers such as, for example, Jeffamine D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its tereoisomeric forms and salts thereof, hexane diamine, hydrazine and iperazine. In the practice of the present invention, the latex chain extender is often used as a solution of chain extender in water.

While the minor portion of a latex chain extender of the present invention can be water, preferably it is a diamine other than AEEA. of the extent that a latex chain extender other than water is used in the formulations of the present invention, preferably it is used at an amount such that the equivalents of active hydrogens of the chain extender is less than about 90 percent of the isocyanate equivalents represented by the prepolymer NCO content. Even more preferably, the chain extender is present at an amount such that the equivalents of active hydrogens of the chain extender is from about 80 to about 90 percent of the isocyanate equivalents represented by the prepolymer NCO content.

In any latex formulation of the present invention, at least 10 molar percent but, preferably, at least 51 molar percent of the latex chain extender, excluding water, is AEEA. More preferably, at least 75 molar percent of the latex chain extender, excluding water, is AEEA. Including water, at least 10 molar percent, but preferably 25 molar percent of the latex chain extenders of the present invention is AEEA. In order to calculate the amount of water acting as a latex chain extender with the present invention, the number isocyanate equivalents of prepolymer is determined and from that number is subtracted the total number of active hydrogen equivalents of AEEA and any other latex chain extender used. The remainder is the number of equivalents of water acting as a latex chain extender.

The latexes of the present invention are not internally stabilized by the incorporation of ionic groups within the polymer backbone. For example, there are no sulfonate nor carboxylate ions pending from the backbone of the prepolymers of the present invention. Also, surfactants useful with the present invention are selected so as to be substantially unreactive with prepolymers of the present invention when used as external stabilizers for the latexes of the present invention.

In addition to polyisocyanates and active hydrogen containing compounds, the polyurethane formulation useful for preparing the polyurethane latexes of the present invention can include additional materials called additives. For example, formulations useful with the present invention can include fillers, thixotropic agents, surfactants, catalysts, dispersion aids, crosslinkers, and the like. Any additive known to be useful to one of ordinary skill in the art of preparing polyurethane latexes can be used with the present invention. The additives are preferably added to either the polyisocyanate or the polyol component of the prepolymer formulation, more preferably added to the polyol component, but can be added in any way useful in forming a polyurethane latex.

The admixtures, emulsions and dispersions of the present invention are all prepared by admixing the liquid components of a prepolymer formulation and a continuous aqueous phase in the substantial absence of an organic solvent such as toluene or acetone. The resultant latexes can be prepared any batch or continuous process known to those of ordinary skill in the art of preparing latexes to be useful for preparing such latexes. Preferably, the latexes of the present invention are prepared by a continues method. Also, preferably, the latexes of the present invention are prepared by a phase inversion or a high internal phase ration process.

A variety of mechanical mixing devices and equipment is commercially available for accomplishing the admixing necessary to prepare the latexes of the present invention. The effectiveness of admixing can be measured by the mean volume particle size of the resulting emulsion. A mean volume particle size of less than about 5 microns is an indication that adequate mixing has been accomplished. Most preferably, a mean volume particle size less than about 2.0 microns is desired for the practice of this invention. U.S. Pat. No. 5,539,021 to Pate disclosed one means of admixing a polyurethane latex useful with the present invention, but any means of admixing the prepolymer formulation components of the present invention which produces a latex having a particle size of less than about 5 microns can be used.

The latexes of the present invention can be prepared with additives included in the latex prepolymer formulations or in the latexes themselves. Any additive useful in a latex formulation or a polyurethane latex prepolymer formulation can be used with the present invention. For example, the latexes of the present invention can be prepared with flame retardant material. In one embodiment of the present invention, the latexes of the present invention include an inorganic filler. In another embodiment of the present invention, the latexes of the present invention are prepared with a monol as an additive in the latex prepolymer formulation.

The latexes of the present invention has many applications wherein it is desirable to increase the adhesion of a latex polymer to a polar surface. Exemplary applications include: pressure sensitive adhesives (PSAs), carpet backings, upholstery backings, sizing agents, conventional adhesives, coatings, non-woven binders, textile coatings and the like. The latexes of the present invention can be used in any such application wherein the use of AEEA as a chain extender is not prohibited.

The following examples are provided to illustrate the present invention. The examples are not intended to limit the scope of the present invention and should not be so interpreted. Amounts are in weight parts or weight percentages unless otherwise indicated. Materials used in the examples are as defined below:

Polyol is a 12.5 percent ethylene oxide (EO) capped propylene oxide (PO) diol having an equivalent weight of 1,000 g/eq.

Monol 1 is a 950 molecular weight polyoxyethylene monol initiated from methanol.

Monol 2 is an 1800 molecular weight 50 percent ethylene oxide, 50 percent propylene oxide hetero monol.

Polyisocyanate 1 is mixture of 50 percent 2,4'-MDI and 50 percent 4,4'-MDI.

Polyisocyanate 2 is a 80:20 weight admixture of 2,4 toluene diisocyanate and 2,6 toluene diisocyanate.

Polyisocyanate 3 is a 98 percent weight 4,4'-MDI.

Surfactant 1 is a 20 percent solution of sodium dodecyl benzene sulfonic acid surfactant in water sold under the trade designation RHODACAL DS-10, which is a trade designation of Rhone Poulenc.

Surfactant 2 is triethanol amine laurel sulfate 40 percent in water sold as DESULF TLS-40 which is a trade designation of DEFOREST ENTERPRISES.

Surfactant 3 is a 40 percent active dodecyl sodium sulfonate sold as BIOTERGE AS-40 which is a trade designation of the Stepan Company. Surfactant 4 is a 22 percent solution of sodium n-dodecyl benzene sulfonic acid surfactant in water sold under the trade designation POLYSTEP A-15, which is a trade designation of Stepan Company.

Physical Property Testing is done according to ASTM D-1708 unless otherwise stated.

EXAMPLE 1

A prepolymer is prepared by admixing 308.1 g of Polyol, 12.0 g of Monol 1, 8.1 g of diethylene glycol, 199.8 g of Polyisocyanate 1 and heating to 70° C. for 15 hours.

A polyurethane latex is prepared by weighing 50 grams of the prepolymer into an 8 oz glass bottle having an internal diameter of 5.6 cm. The prepolymer is cooled to 9° C. with a waterbath. The bottle is clamped into place and an INDCO* mixing blade (4.3 cm diameter) is inserted into the prepolymer such that the blade is just covered by the liquid. (*INDCO is a trade designation of INDCO, INC). 60 g of water is then fed into the prepolymer at a rate of 12 g/minute for 5.0 min. A timer is initiated and stirring begun at a rate of 3000 rpm. At 30 seconds into the water feed, a surfactant (4.9 g of Surfactant 1) is introduced over a period of 5 seconds via syringe. After complete addition of the water, 22.8 g of a solution of 15% AEEA in water is added via syringe.

The resulting 40% solids latex is then poured into a plastic tripour beaker, covered tightly with aluminum foil and allowed to stir gently overnight with a magnetic stirrer. The next day the latex is filtered through a coarse paint filter, cast onto polypropylene, and allowed to dry under ambient conditions overnight. The resulting film is heated at 90° C. for 1 hour resulting in a film with the following tensile properties: 2960 psi (20408 KN/M$^2$) ultimate tensile strength, 698% elongation, 689 psi (4750 KN/M$^2$) Young's modulus. The filtered 40% solids latex has an average particle size of 1.3 microns.

The latex is next cast onto nylon-6 by pipetting it onto a 0.25 inch×11 inch×1.5 inch (0.635 cm×28 cm×3.81 cm) nylon-6 substrate. It is allowed to dry overnight and then cured at 90° C. for 1 hour. A one inch wide strip of film is marked on the center of the substrate, a cut is made along the marks, and the unused film is peeled away from the sides of the substrate. The resulting one inch strip is then peeled using a 90 degree peel test in which the sample moved in conjunction with the rate of peel via a moving fixture on a stress strain device. The peel rate is 2 inches per minute. The average peel strength for five specimens is used as the mean peel strength. The mean peel strength of the polymer on nylon-6 is 8.3 lb./linear inch (1.7 Kg/linear cm).

COMPARATIVE EXAMPLE 2

A prepolymer and polyurethane latex are prepared and tested substantially identically to those prepared in Example 1 except that 18.45 g of a 15 percent solution of piperazine in water instead of 22.8 g of a solution of 15% AEEA in water is used as the latex chain extender.

The physical properties are 3971 psi (27379 KN/M$^2$) ultimate tensile strength, 575% elongation, 1376 psi (9487 KN/M2) Young's modulus. The filtered 40% solids latex has an average particle size of 0.48 microns.

The peel strength of the polymer on nylon-6 is 2.2 lb./linear inch (0.39 Kg/linear cm).

EXAMPLE 3

A prepolymer is prepared by admixing 7.5 g of dimethylol propionic acid (finely ground using a mortar and pestle), 187.5 g Polyol, and 15 g Monol 1 in a round bottom flask and heated to 80° C. with stirring for 20 minutes. 90 g of Polyisocyanate 2 are added and stirring is continued at 80° C. for 17 hours.

A polyurethane latex is prepared by weighing 50 grams of the prepolymer into an 8 oz glass bottle having an internal diameter of 5.6 cm. The prepolymer is cooled to 9° C. with a waterbath. The bottle is clamped into place and an INDCO mixing blade (4.3 cm diameter) is inserted into the prepolymer such that the blade was just covered by the liquid. A timer is initiated and stirring begun at a rate of 3000 rpm. A solution of 1.04 g triethanol amine in 10g of water are added to the prepolymer over a 30 second period. At 30 seconds into the water feed, a surfactant (1.23 g of Surfactant 1) is introduced over a period of 5 seconds via syringe. 50 g of water is then fed into the prepolymer at a rate of 12 g/minute for 4.16 minutes. After complete addition of the water, 17.5 g of a solution of 15% AEEA in water is added via syringe.

The resulting 41% solids latex is then poured into a plastic tripour beaker, covered tightly with aluminum foil and allowed to stir gently overnight with a magnetic stirrer. The next day the latex is filtered through a coarse paint filter, cast onto polypropylene, and allowed to dry under ambient conditions overnight. The resulting film is heated at 90° C. for 1 hour resulting in a tough continuous film.

EXAMPLE 4

A prepolymer is prepared by admixing 5 g of dimethylol propionic acid (finely ground using a mortar and pestle), 60 g Polyol, and 5 g Monol 1 in a round bottom flask and heated to 80° C. with stirring for 20 minutes. 30 g of Polyisocyanate 2 are added and stirring is continued at 80° C. for 17 hours.

A polyurethane latex is prepared by weighing 50 grams of the repolymer into an 8 oz glass bottle having an internal diameter of 5.6 cm. The prepolymer is cooled to 9° C. with a waterbath. The bottle is clamped into place and an INDCO mixing blade (4.3 cm diameter) is inserted into the prepolymer such that the blade was just covered by the liquid. A timer is initiated and stirring begun at a rate of 3000 rpm. A solution of 2.09 g triethanol amine in 10 g of water are added to the prepolymer over a 30 second period. At 30 seconds into the water feed, a surfactant (1.23 g of Surfactant 1) is introduced over a period of 5 seconds via syringe. 45 g of water is then fed into the prepolymer at a rate of 12 g/minute for 3.75 minutes. After complete addition of the water, 26.6 g of a solution of 15% AEEA in water is added via syringe.

The resulting 40% solids latex is then poured into a plastic tripour beaker, covered tightly with aluminum foil and allowed to stir gently overnight with a magnetic stirrer. The next day the latex is filtered through a coarse paint filter and cast onto polypropylene and allowed to dry under ambient conditions overnight.

The physical properties are 773 psi ($KN/M^2$) ultimate tensile strength, 400% elongation, 1236 psi ($KN/M^2$) Young's modulus. The peel strength of the polymer on nylon-6 is 11.1 lb./linear inch (2.0 Kg/linear cm).

EXAMPLE 5

A prepolymer is prepared by admixing 308.1 g of Polyol, 12.0 g of Monol 1, 8.1 g of diethylene glycol, 199.8 g of Polyisocyanate 1 and heating to 70 degrees C for 15 hours.

A polyurethane latex is prepared by weighing 50 grams of the prepolymer into an 8 oz glass bottle having an internal diameter of 5.6 cm. The bottle is clamped into place and an INDCO mixing blade (4.3 cm diameter) is inserted into the prepolymer such that the blade was just covered by the liquid. 33.5 g of water is then fed into the prepolymer at a rate of 13.8 g/minute for 2.42 min. A timer is initiated and stirring begun at a rate of 3000 rpm. At 30 seconds into the water feed, a surfactant (3.5 g of Surfactant 2) is introduced over a period of 5 seconds via syringe. After complete addition of the water, 34.2 g of a solution of 10% AEEA in water is added via syringe.

The resulting 45% solids latex is then poured into a plastic tripour beaker, covered tightly with aluminum foil and allowed to stir gently, overnight with a magnetic stirrer. The next day the latex is filtered through a coarse paint filter and cast onto polypropylene and allowed to dry under ambient conditions overnight. The resulting film is heated at 90° C. for 1 hour resulting in a film with the following tensile properties: 2752 psi (18974 $KN/M^2$) ultimate tensile strength, 723% elongation, 590 psi (4068 $KN/M^2$) Young's modulus. The filtered 40% solids latex has an average particle size of 0.52 microns. The latex is next cast onto nylon-6 by pipetting it onto a 0.25 inch×11 inch×1.5 inch (0.635 cm×28 cm×3.81 cm) nylon-6 substrate. It is allowed to dry overnight and then cured at 90° C. for 1 hour. A one inch wide strip of film is marked on the center of the substrate, a cut is made along the marks, and the unused film is peeled away from the sides of the substrate. The resulting one inch strip is then peeled using a 90 degree peel test in which the sample moved in conjunction with the rate of peel via a moving fixture on a stress strain device. The peel rate is 2 inches (5.1 cm) per minute. The average peel strength for five specimens is used as the mean peel strength. The mean peel strength of the polymer on nylon-6 is 5.3 lb./linear inch (0.95 Kg/linear cm).

The peel strength for the latex on 304 stainless steel is similarly tested and is 0.30 lb./linear inch. The peel strength for polyethylene terephthalate is similarly tested and is 1.9 lb./linear inch (0.34 Kg/linear cm).

COMPARATIVE EXAMPLE 6

A prepolymer and polyurethane latex is prepared and tested substantially identically to Example 5 except: 38.0 g rather than 33.5 g of water is used; 3.4 g instead of 3.5 g of Surfactant 2 is used; and 28.3 g of a 10 percent solution of piperazine instead of 34.2 g of a 10 percent solution of AEEA is used.

The resulting film has the following tensile properties: 3318 psi (22877$KN/M^2$) ultimate tensile strength, 519% elongation, 1312 psi (9046 $KN/M^2$) Young's modulus. The filtered 45% solids latex has an average particle size of 0.70 microns.

The mean peel strength of the polymer on nylon-6 is 0.12 lb./linear inch (1.7 Kg/linear cm).

The peel strength for the latex on 304 stainless steel is similarly tested and is 0.1 lb./linear inch (0.02 Kg/linear cm). The peel strength for polyethylene terephthalate is similarly tested and is 0.3 lb./linear inch (0.05 Kg/linear cm).

EXAMPLE 7

A polyurethane prepolymer useful for preparing a PSA is prepared by admixing 66 parts Polyol; 15 parts of Monol 2; and 19 parts of Polyisocyanate 3 and heating at 70° C. for 15 hours.

A polyurethane latex is prepared by placing 50 parts of the polyurethane prepolymer in a beaker and stirred at high shear. About parts of water are then added to the prepolymer. After the 10 parts of water, 1.08 parts Surfactant 4 are added. Over a 5 minute period, an additional 79.8 parts of water are added. After the addition of the water, 6.0 parts of a 10 percent solution of AEEA in water are added resulting in a polyurethane which is about 30 percent chain extended based on the starting level of isocyanate.

Adhesive properties are measured by first coating a three mil (0.08 mm) mylar film by spraying the latex onto the mylar film and then drying the mylar film at 160° F. for 15 minutes. Tackiness is measured by a loop tack method, where the coated mylar film is looped in the grips of an Instron™ testing machine with the adhesive on the outside of the loop. The loop is brought into contact with a polished steel panel (PSTC, Pressure Sensitive Tape Council certified, 304 stainless steel) with no force beyond its own weight and stiffness from the loop. The loop is then immediately removed at 300 mm/min. The loop tack value is reported as the peak load to debond in the Table.

Peel strength is determined by using the PSTC-2 method. This is a 90° peel at 300 mm/min. The peel strength is reported as the average value over a 15 cm peel length of the tape. The results are presented in the Table.

EXAMPLE 8

A PSA is prepared and tested substantially identically to Example 7 except for the following. After the 10 parts water and 1.08 parts surfactant are added, 74.2 parts of water are added over 5 minutes. After the addition of the water, 12.1 parts of a 10 percent solution of AEEA in water are added resulting in a polyurethane which is about percent chain extended based on the starting level of isocyanate. Physical property testing results are present in the Table.

COMPARATIVE EXAMPLE 9

A PSA is prepared and tested substantially identically to Example 7 except for the following. After the 10 parts water and 1.08 parts surfactant are added, 80.5 parts of water are added over 5 minutes. After the addition of the water, 5.0 parts of a 10 percent solution of piperazine in water are added resulting in a polyurethane which is about 30 percent chain extended based on the starting level of isocyanate. Physical property testing results are present in the Table.

COMPARATIVE EXAMPLE 10

A PSA is prepared and tested substantially identically to Example 7 except for the following. After the 10 parts water and 1.08 parts surfactant are added, 76.0 parts of water are added over 5 minutes. After the addition of the water, 10.0 parts of a 10 percent solution of piperazine in water are added resulting in a polyurethane which is about 60 percent chain extended based on the starting level of isocyanate. Physical property testing results are present in the Table.

COMPARATIVE EXAMPLE 11

A PSA is prepared and tested substantially identically to Example 7 except for the following. After the 10 parts water and 1.08 parts surfactant are added, 82.5 parts of water are added over 5 minutes. After the addition of the water, 3.5 parts of a 10 percent solution of ethylene diamine in water are added resulting in a polyurethane which is about 30 percent chain extended based on the starting level of isocyanate. Physical property testing results are present in the Table.

COMPARATIVE EXAMPLE 12

A PSA is prepared and tested substantially identically to Example 7 except for the following. After the 10 parts water and 1.08 parts surfactant are added, 78.8 parts of water are added over 5 minutes. After the addition of the water, 7.0 parts of a 10 percent solution of ethylene diamine in water are added resulting in a polyurethane which is about 60 percent chain extended based on the starting level of isocyanate. Physical property testing results are present in the Table.

parts Monol 1, 63.59 parts Polyol, 1.31 parts diethylene glycol, and 33.1 parts Polyisocyanate 1. The threads of the glass bottle are wrapped with Teflon tape to prevent the lid from adhering to the bottle. The bottle is sealed, shaken vigorously until homogeneity of the components is achieved, and then rolled on a bottle roller for 10 minutes. The bottle is then placed in an oven and held at 70° C. for 15 hours, whereupon it is removed and allowed to cool to room temperature prior to use.

A latex is prepared by weighing 75 g of the Prepolymer into an 8 oz glass bottle having an internal diameter of 5.6 cm. The bottle is clamped and an Indco type A mixing blade (4.3 cm diameter) is inserted into the prepolymer such that the blade is just covered by the liquid. 31.5 g of deionized water at 20° C. is fed into the prepolymer at a rate of 13 g/min. for 145 sec. while the contents of the bottle are stirred at a rate of 3000 rpm. At 30 seconds into the water feed, 6.4 g of Surfactant 3 is introduced over a period of no more than 5 seconds with a syringe. After complete addition of the water, 34.0 g of a solution of 15% AEEA in is added with a syringe over a period of about 15 seconds. The resulting latex is then poured into a plastic tripour beaker, covered tightly with aluminum foil and allowed to stir gently overnight with a magnetic stirrer. The next day the latex is filtered through a coarse paint filter.

The latex is next compounded by mixing 178.6 parts latex (having 100 parts solids) with 200 parts calcium carbonate filler. Stirring is begun with latex alone and then the filler is added as quickly as the liquid will accept the filler. A thickener is added until the compounded latex has a viscosity of 23,600 cps. (23.6 Ns/m$^2$). The compounded latex is applied to the back of a nylon level loop style carpet with a greige weight of 23 oz/yd2 (780 g/m$^2$) at a coating weight of 34–35 oz/yd2 (1152–1187 g/m$^2$). A polypropylene scrim having a weight of 3.3 oz/yd2 (112 g/m$^2$) is applied to the carpet as a secondary backing. The carpet is dried at 200° C. for 20 minutes, then allowed to equilibrate overnight before testing.

The carpet is tested for physical properties according to ASTM D1335. The values obtained where the compounded latex had a coat weight of 35.4 oz/yd2 (1201 g/m$^2$) were a Hand of 14/7 lb. (6.67 Kg) and a Tuft Lock of 17.9 lb. (8.17 Kg).

What is claimed is:

1. An article of manufacture comprising a substrate having a polar surface, and adherent thereto, a polyurethane polymer prepared from a latex wherein:

TABLE

| Example No. | Tack lb./lin – in (Kg/lin – cm) | Peel lb./lin – in (Kg/lin – cm) | Peel Build lb./lin – in (Kg/lin – cm) | Percent Build | Thickness mil (mm) |
|---|---|---|---|---|---|
| 7 | >1.1 (0.20) | 5.3 (0.95) | 5.1 (0.91) | −4 | 0.96 (0.024) |
| 8 | >1.1 (0.20) | 3.8 (0.68) | 3.2 (0.57) | −16 | 0.88 (0.022) |
| Comp 9 | >1.1 (0.20) | 3.2 (0.57) | 2.4 (0.43) | −25 | 0.93 (0.024) |
| Comp 10 | 0.855 (0.15) | 2.8 (0.50) | 2.8 (0.50) | 0 | 0.97 (0.025) |
| Comp 11 | 0.751 (0.13) | 0.3 (0.05) | 0.3 (0.05) | 0 | 0.94 (0.024) |
| Comp 12 | 0 | 0 | NA | NA | NA |

EXAMPLE 13

A latex for use as a carpet backing was prepared by first preparing a prepolymer by weighing into a glass bottle: 2.0

(A) the polyurethane latex is prepared from a polyurethane prepolymer which has a polymer backbone substantially free of ionic groups and is prepared from a prepolymer formulation which includes polyols having an average ethylene oxide content of less than 80 weight percent of total polyol weight, (B) the prepolymer is chain extended with an aminoethyl ethanolamine (AEEA) chain extender, and (C) the prepolymer and latex are prepared in the substantial absence of an organic solvent.

2. The article of claim 1 wherein the latex is prepared by admixing a polyurethane prepolymer with water in the presence of a surfactant present in an amount of from about 0.1 to about 3.5 weight percent of the solids content of the latex.

3. The article of claim 2 wherein the surfactant is present in an amount of from about 1 to about 3.5 weight percent of the solids content of the latex.

4. The article of claim 1 wherein the prepolymer formulation includes polyols having an average ethylene oxide content of less than weight percent average ethylene oxide content.

5. The article of claim 1 wherein at least 10 molar percent of the chain extender, excluding water, is AEEA.

6. The article of claim 5 wherein at least 51 molar percent of the chain extender, excluding water, is AEEA.

7. The article of claim 6 wherein at least 75 molar percent of the chain extender, excluding water, is AEEA.

8. A process for preparing a latex coated substrate comprising applying a polyurethane latex to a polar surface of a substrate having a polar surface wherein:

(A) the polyurethane latex is prepared from a polyurethane prepolymer which has a polymer backbone substantially free of ionic groups and is prepared from a prepolymer formulation which includes polyols having an average ethylene oxide content of less than 80 weight percent of total polyol weight, (B) the prepolymer is chain extended with an aminoethyl ethanolamine (AEEA) chain extender, and (C) the prepolymer and latex are prepared in the substantial absence of an organic solvent.

9. The process of claim 8 wherein at least 51 molar percent of the chain extender, excluding water, is AEEA.

10. The process of claim 9 wherein at least 75 molar percent of the chain extender, excluding water, is AEEA.

11. A method for improving adhesion of a polyurethane polymer to a substrate having a polar surface, the method comprising:

(a) formulating a polyurethane latex from a polyurethane prepolymer, which has a polymer backbone substantially free of ionic groups, in the substantial absence of an organic solvent, the polyurethane prepolymer including polyols having an average ethylene oxide content of less than 80 weight percent of total polyol weight and being chain extended with an aminoethyl ethanolamine chain extender;

(b) applying the polyurethane latex to a substrate having a polar surface; and (c) forming a polymer from the latex, wherein a mean peel strength between the polymer and the substrate is improved when compared to a mean peel strength between a second polymer and an identical substrate, the second polymer being prepared from a prepolymer that was chain extended without an aminoethyl ethanolamine chain extender.

* * * * *